(12) United States Patent
Marbach

(10) Patent No.: US 6,264,248 B1
(45) Date of Patent: *Jul. 24, 2001

(54) QUICK COUPLING FOR A HOSE

(75) Inventor: Gérard Marbach, Cernay (FR)

(73) Assignee: Sevylor International, Issy les Moulineaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,560

(22) Filed: May 29, 1998

(30) Foreign Application Priority Data

Jun. 3, 1997 (FR) .................................................. 97 06796

(51) Int. Cl.⁷ .................................................. F16L 33/00
(52) U.S. Cl. .......................................... 285/248; 285/401
(58) Field of Search .................................. 285/246, 247, 285/248, 387, 388, 249, 245, 401

(56) References Cited

U.S. PATENT DOCUMENTS

| | | | |
|---|---|---|---|
| 795,977 | * 8/1905 | Hogan | 285/401 X |
| 862,578 | * 8/1907 | Muehlberg | 285/248 |
| 1,195,433 | * 8/1916 | Bailey | 285/247 |
| 3,425,026 | * 1/1969 | Theunissen | 285/362 X |
| 4,162,092 | * 7/1979 | Hayes | 285/248 X |
| 4,729,583 | 3/1988 | Lalikos et al. . | |
| 4,904,002 | 2/1990 | Sasa et al. . | |
| 5,042,152 | 8/1991 | Sasa et al. . | |
| 5,080,405 | 1/1992 | Sasa et al. . | |
| 5,579,762 | * 12/1996 | Lee | 285/246 X |
| 5,799,989 | * 9/1998 | Albino | 285/249 X |
| 6,017,066 | * 1/2000 | Giuffre' | 285/247 X |
| 6,019,399 | * 2/2000 | Sweeney | 285/248 |
| 6,022,053 | * 2/2000 | Hukuda | 285/246 |
| 6,050,987 | * 4/2000 | Rosenbaum | 285/248 X |

FOREIGN PATENT DOCUMENTS

| | | | |
|---|---|---|---|
| 3311123 | 9/1984 | (DE) . | |
| 9011944 | 10/1990 | (DE) . | |
| 9311672 | 10/1993 | (DE) . | |
| 1146672 | * 11/1957 | (FR) | 285/248 |
| 2385969 | 10/1978 | (FR) . | |
| 959100 | * 5/1964 | (GB) | 285/249 |
| 175468 | * 5/1961 | (SE) | 285/249 |

* cited by examiner

Primary Examiner—Lynne H. Browne
Assistant Examiner—Greg Binda
(74) Attorney, Agent, or Firm—Dean W. Russell; Kilpatrick Stockton LLP

(57) ABSTRACT

Quick coupling for a hose (4), comprising a tubular end fitting (2) which has an axial tapering surface (3) that can be pushed at least partially into the end of the hose (4); a clamping ring (5) mounted to rotate on the end fitting (3) and having, at its end facing the tapering surface, an axial opening (9) with a diameter that is between the extreme diameters of the tapering surface (3); and guide means (6, 8; 13, 14) provided on the end fitting (3) and on the ring (5), arranged so that rotation of the ring is accompanied by an axial movement thereof; by virtue of which, when the ring is tightened onto the end fitting, its axial movement along the tapering surface tightens it onto the said tapering surface with the end of the hose being tightened and locked against the tapering surface. (FIG. 1).

2 Claims, 2 Drawing Sheets

QUICK COUPLING FOR A HOSE

FIELD OF THE INVENTION

The invention relates to improvements made to quick couplings for hoses, particularly for ringed hoses like those used for supplying and removing water for domestic pools.

SUMMARY OF THE INVENTION

The object of the invention is essentially to provide such a quick coupling which is effective, reliable and of low cost.

A quick coupling like the aforementioned one is essentially characterized, being designed in accordance with the invention, in that it comprises:

a tubular end fitting which has an axial tapering surface that can be pushed at least partially into the end of a hose, a clamping ring mounted to rotate on the end fitting and having, at its end facing the tapering surface, an axial opening with a diameter that is between the extreme diameters of the tapering surface, and guide means provided on the end fitting and on the ring, arranged so that rotation of the ring is accompanied by an axial movement thereof.

Thanks to this arrangement, when the ring is turned on the end fitting in the direction of tightening, its accompanying axial movement in the direction of the increasing diameters of the tapering surface of the end fitting tightens it onto the said tapering surface, accompanied by the tightening and locking of the end of the hose against the tapering surface.

Such an arrangement is particularly advantageous when used with a ringed hose. This is because the ring then interacts with the last ring or one of the last rings of the hose: during its axial movement which accompanies its rotation, the ring axially carries the end of the hose with it, and this thus perfects the penetration of the said end over the tapering surface of the end fitting.

It will be understood that the pinching of the end of the hose between the ring and the tapering surface of the end fitting is capable of providing a perfectly watertight seal, given the relative deformability and relative crushing that the material (plastic) of which the hose is made can withstand. Furthermore, this results in self-locking of the ring.

In definitive terms, a coupling thus formed is structurally simple because it has just two component parts (the end fitting and the ring) which can be manufactured at low cost from plastic by moulding; its use is simple and quick.

Advantageously, the guide means comprise at least one groove provided on a support surface of the end fitting, or respectively on the internal face of the ring and at least one projection engaged in the aforementioned groove and provided respectively on the internal face of the ring or on a support surface of the end fitting, the said groove being at least partially inclined with respect to the axis of the end fitting or of the ring; it is then possible to contrive for the interacting groove and projection to form complementary screw threads, or indeed also for the projection to be shaped as a radial finger and for the groove to have a terminal portion approximately perpendicular to the axis of the ring, so as to form a locking system of the bayonet type.

As a preference, the inclined part of the groove is steeply inclined with respect to the axis of the end fitting in order to define a component of quick axial movement of the ring as it is rotated (rotation through a quarter of a turn, for example).

In one preferred embodiment, the ring has a large-diameter axial opening and associated with it, on the inside, is a split washer which has an inside diameter which is the aforementioned diameter between the extreme diameters of the tapering surface, by virtue of which it is the split washer which elastically traps and locks the end of the hose onto the tapering surface of the end fitting when the ring is turned in the tightening direction. A coupling arranged in this way has the advantage of accepting hoses of different outside diameters while at the same time affording a leaktight, effective and reliable attachment.

The embodiment whereby the ring is a single, one-piece construction, is admittedly the simplest and seems to warrant the broadest development. However, at least for specific fields of use, recourse may be had to a ring that consists of two half-rings that can be joined together by diametrically opposed connecting means; in particular, the two half-rings may be joined together in an articulated way by one of their ends, and the connecting means are provided at their diametrically opposed ends, in the manner of a hinged bangle.

BRIEF DESCRIPTION OF THE DRAWINGS

The invention will be better understood from reading the detailed description which follows of certain embodiments which are given merely by way of non-limiting examples. In this description, reference is made to the appended drawings in which.

DETAILED DESCRIPTION

Figure 1:
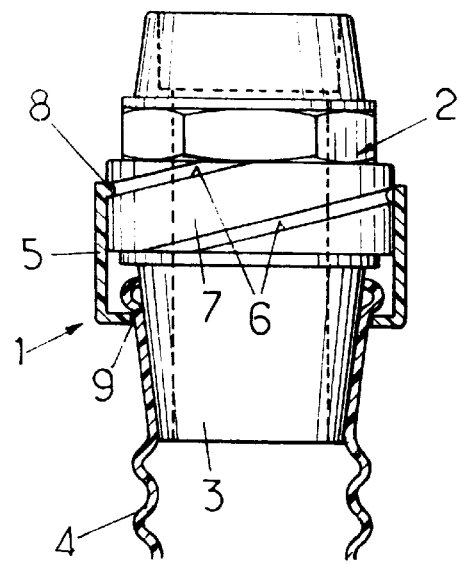
FIG. 1 is a side view, in section, of a coupling designed in accordance with the invention.
Figure 2:
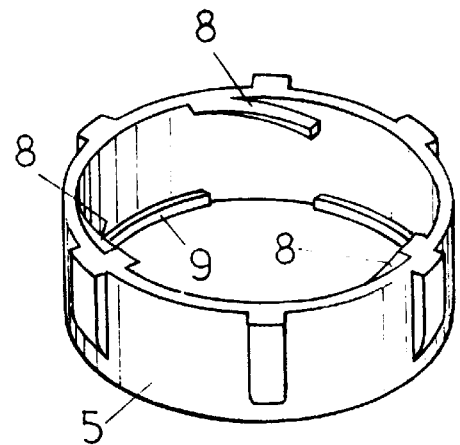
FIG. 2 is a perspective view of the ring of the coupling of FIG. 1.

Referring first of all to FIGS. 1 and 2, the coupling 1 comprises an end fitting 2 which, at one of its ends, has a tapering tubular surface 3 over which the end of a hose 4 is pushed.

A clamping ring 5 is mounted to rotate on the end fitting 2, and guide means are provided on the end fitting 2 and on the ring 5 so that a rotation of the ring 5 about the end fitting 2 is accompanied by an axial movement of the said ring on the end fitting. In the example illustrated in FIGS. 1 and 2, the guide means comprise one or more grooves 6 cut on a support surface 7 of the end fitting 2 and one or more projections 8 of a shape that complements that of the grooves 6, carried by the internal face of the ring 5. In the example depicted, the grooves 6 and the projections 8 form complementary screw threads which are steeply inclined (for example by 30° to 45°) with respect to the axis of the end fitting so as to obtain an appreciable axial movement of the ring for a relatively short rotation thereof (for example so-called "quarter turn" screwing).

Finally, the end of the ring 5 which lies facing the tapering surface 3 of the end fitting 2 has an axial opening 9, the diameter of which has a value between the extreme (minimum and maximum) diameters of the tapering surface 3 or, as shown in FIG. 1, greater than at least the minimum diameter of tapering surface 3. As a preference, furthermore, the edge of the opening situated towards the inside of the ring has a sharp or relatively sharp edge so that it forms an anchoring means, as will become clear later.

This being the case, when the ring is in the slackened or unscrewed position on the end fitting, there is a gap between the contour of the opening 9 of the ring and the tapering surface 3. This gap allows the passage of a hose, for example made of plastic, which is pushed onto the tapering end fitting 3. Then, as the ring is turned, this ring travels axially up along the end fitting until the sharp edge of the opening 9 comes to rest against the tapering surface 3, pinching the wall of the hose. The relative deformability and relative crushing of the material (plastic) of the hose makes the clamping of the ring self-locking and the hose 4 can no longer move axially. Furthermore, this peripheral clamping exerted on the hose ensures that the joint thus produced is leaktight.

Furthermore, the end fitting and the ring are components of simple shapes which can be manufactured in vast numbers and at low cost, for example out of plastic by moulding.

It will be noted that during the rotation of the ring and its accompanying axial movement, when the sharp edge of the opening 9 begins to interact positively with the outside wall of the hose 4, the hose finds itself carried axially along the tapering surface 3 and its push-fit thereon is thus confirmed.

This effect of axial driving becomes all the more pronounced when the hose is of the ringed type: as illustrated in FIG. 1, the edge of the opening 9 rests under the last ring or one of the last rings of the end of the hose and the axial movement of the ring is then imparted positively to the hose.

Figure 4:
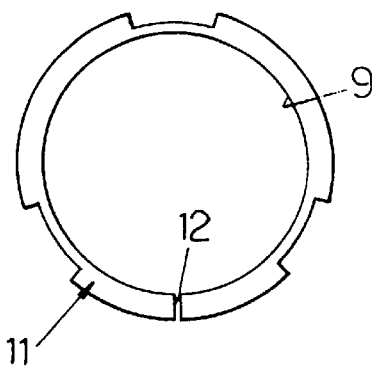
FIG. 4 is a view from above of a split washer used in the coupling of FIG. 3.
Figure 3:
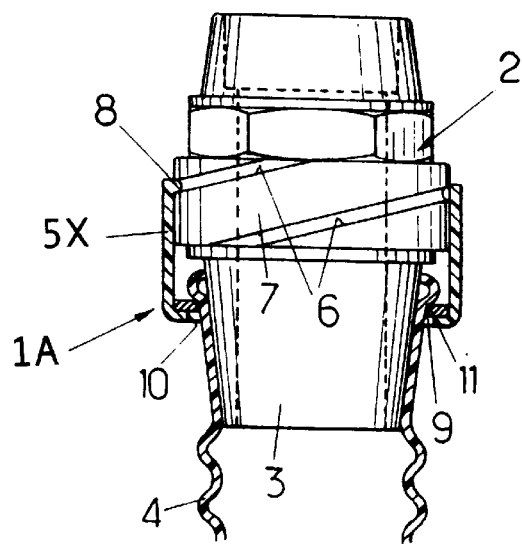
FIG. 3 is a side view, in section, of an alternative form of coupling of FIG. 1.

In order to make it easier for the coupling 1 just described to be used with hoses that may have different outside diameters, it is preferable to resort to an alternative embodiment of coupling 1A depicted in FIGS. 3 and 4. The ring 5X has an axial opening 10 which has a diameter larger than the diameter 9 indicated earlier as can be seen in FIG. 3 (in practice at least equal to the maximum diameter of the tapering surface), and a washer 11 is fitted inside the ring 5X. This is a washer which is split at 12 (FIG. 4), and the central opening of which constitutes the abovementioned opening 9. Thanks to this arrangement, it is the washer 11 which constitutes the member that clamps the hose onto the tapering surface, and its capacity for radial deformation allows it to accept hoses of varying diameters within a predetermined range, and at the same time, the elasticity thus acquired improves the self-locking nature of the clamping of the ring 5X on the tapering surface 3. The ring 5X then acts as a member for retaining and for driving the washer 11.

Of course, the guide means may be designed in any desirable way, and what has been explained earlier in relation to FIGS. 1 and 2 has been given merely by way of an example. A reverse arrangement (grooves 6 on the internal wall of the ring 5 and projections 8 on the support surface 7 of the end fitting 2) could just as easily be adopted.

Figure 5:
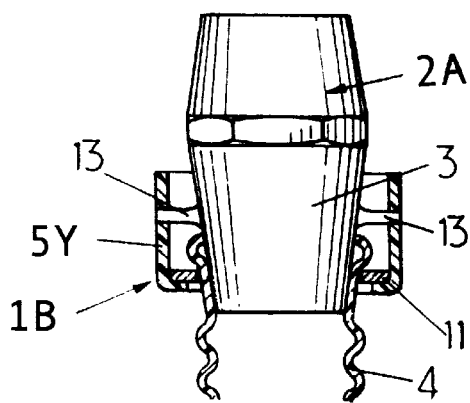
FIG. 5 is a side view, in section, of another alternative embodiment of the coupling of FIG. 1.
Figure 6:
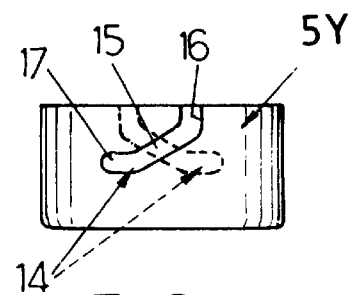
FIG. 6 is a side view of the ring of the coupling of FIG. 5.

Illustrated in FIGS. 5 and 6 is an arrangement of coupling 1B of the bayonet type, whereby the end fitting 2A has one or more (two in the example depicted) radially-projecting fingers 13 which are engaged in respective grooves 14 cut into the lateral wall of the ring 5Y. Each groove 14 has an approximately straight portion 15 which is inclined with respect to the axis of the ring 5Y and which opens into the anterior edge of the ring, possibly via a short portion 16 parallel to the axis of the ring. The portion 15 is followed by a terminal portion 17 which is approximately transverse to the axis of the ring, corresponding to a position of axial locking of the ring 5Y clamped on the tapering surface 3.

Certain hoses, particularly ringed hoses, may have an outside diameter, at the rings, which exceeds the diameter of the opening 9 of the ring 5Y or of the washer 11. To simplify assembly between hose and ring, it may be advantageous to produce the ring in the form of two parts that can be joined together, so that the two half-rings can be brought over the hose transversely thereto, whereas a one-piece ring could not be slipped axially over its free end.

Figure 7:
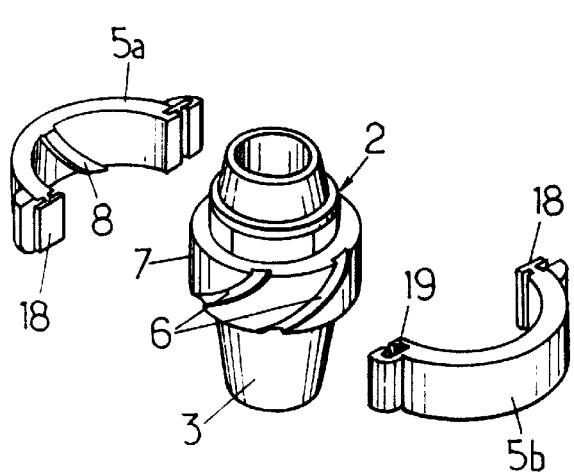
FIGS. 7 and 8 are views of alternate embodiments of the ring of FIG. 6.
Figure 8:
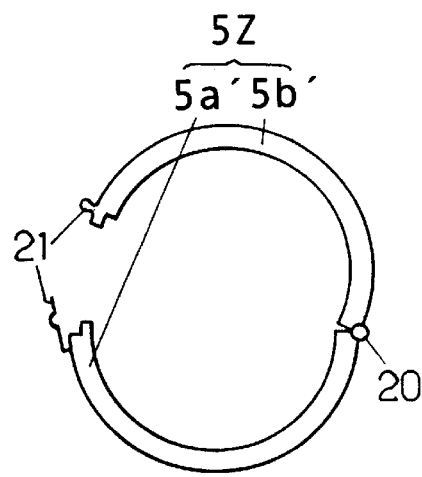

FIGS. 7 and 8 illustrate two possible embodiments of such an arrangement.

In FIG. 7, the ring is constructed in the from of two identical half-rings 5a, 5b, the ends of which are fitted with sliding-type securing means, each comprising, at one end, a T-shaped shoe 18 and, at the other, a T-shaped groove 19 that complements the said shoe 18. The two half-rings 5a, 5b are brought together one on each side of the end fitting 2, with an axial offset with respect to each other; they are then brought together axially and the shoes 18 are introduced into the grooves 19, at the same time as the projections 8 are brought to face the grooves 6 and enter these.

FIG. 8 shows a very diagrammatic view from above of a ring 52 produced in the form of a hinged bangle, the two half-rings 5a', 5b' of which are joined together and hinged together with rotation at 20 by one of their ends. At their other end, attachment means 21 allow the two half-rings to be locked in the closed position.

As goes without saying and as is already obvious from the foregoing, the invention is not in any way restricted to those of its applications and embodiments which have been more specifically envisaged; on the contrary, it encompasses all alternative forms thereof.

What is claimed is:

1. An assembly comprising:
   a. a hose which, in use, forms part of a water circuit for a swimming pool, the hose defining:
      i. a ringed portion; and
      ii. an end portion comprising:
         A. a single ring; and
         B. a smooth portion intermediate the single ring and the ringed portion;
   b. a tubular fitting which has an axial tapering surface that can be pushed at least partially into the end portion of the hose;
   c. a clamping ring mounted to rotate on the fitting and having an end facing the tapering surface, the end defining an axial opening; and
   d. guide means provided on the fitting and ring and arranged so that rotation of the ring is accompanied by an axial movement thereof, so that when the ring is turned on the fitting in a first direction, its accompanying axial movement in the direction of the increasing diameter of the tapering surface of the fitting tightens the ring onto the tapering surface, accompanied by the tightening and locking of the end portion of the hose against the tapering surface.

2. An assembly according to claim 1 in which the guide means is arranged so that rotation of the ring in the first direction pulls at least the single ring of the end portion of the hose axially along the tapering surface.

* * * * *